United States Patent [19]
O'Brien

[11] Patent Number: 4,786,181
[45] Date of Patent: Nov. 22, 1988

[54] EXTRUDER SCREW AND METHOD FOR EXTRUDING LIQUID CRYSTALLINE POLYMERS

[75] Inventor: Keith T. O'Brien, Edison, N.J.

[73] Assignee: Hoechst Celanese Corporation, Chatham, N.J.

[21] Appl. No.: 121,285

[22] Filed: Nov. 16, 1987

Related U.S. Application Data

[62] Division of Ser. No. 847,387, Apr. 2, 1986, Pat. No. 4,729,662.

[51] Int. Cl.$^4$ .................. B28C 1/16; B28C 3/00; B29B 1/04
[52] U.S. Cl. ........................................ 366/89; 366/79; 366/323
[58] Field of Search .................. 366/79, 83, 87–90, 366/144–146, 318, 319, 321–323; 425/207–209

[56] References Cited

U.S. PATENT DOCUMENTS

| | | | |
|---|---|---|---|
| 3,431,599 | 3/1969 | Fogelberg | 366/89 |
| 4,155,655 | 5/1979 | Chiselko et al. | 366/89 X |
| 4,181,647 | 1/1980 | Beach | 366/89 X |
| 4,201,481 | 5/1980 | Iddon et al. | 366/318 X |
| 4,350,657 | 9/1982 | Jones et al. | 366/89 X |
| 4,405,239 | 9/1983 | Chung et al. | 366/89 X |

Primary Examiner—Timothy F. Simone
Attorney, Agent, or Firm—Burns, Doane, Swecker & Mathis

[57] ABSTRACT

The present invention relates to a novel extruder screw and method for extruding low melt viscosity polymers which form an anisotropic melt phase. In a preferred embodiment, the method and apparatus according to the present invention employ a high rate of rotational speed of the extruder screw in combination with a relatively low compression ratio and a high volume rate of flow through a compression section in order to effectively extrude the low melt viscosity liquid crystalline polymers. The particular design of the screw is dictated by the unique rheology of the polymers which are difficult to effectively move along the helix of the screw due, in part, to the extremely low viscosity. Each dimension and each relative size of the various sections of the screw must be carefully controlled in order to effectively extrude the unique material.

15 Claims, 2 Drawing Sheets

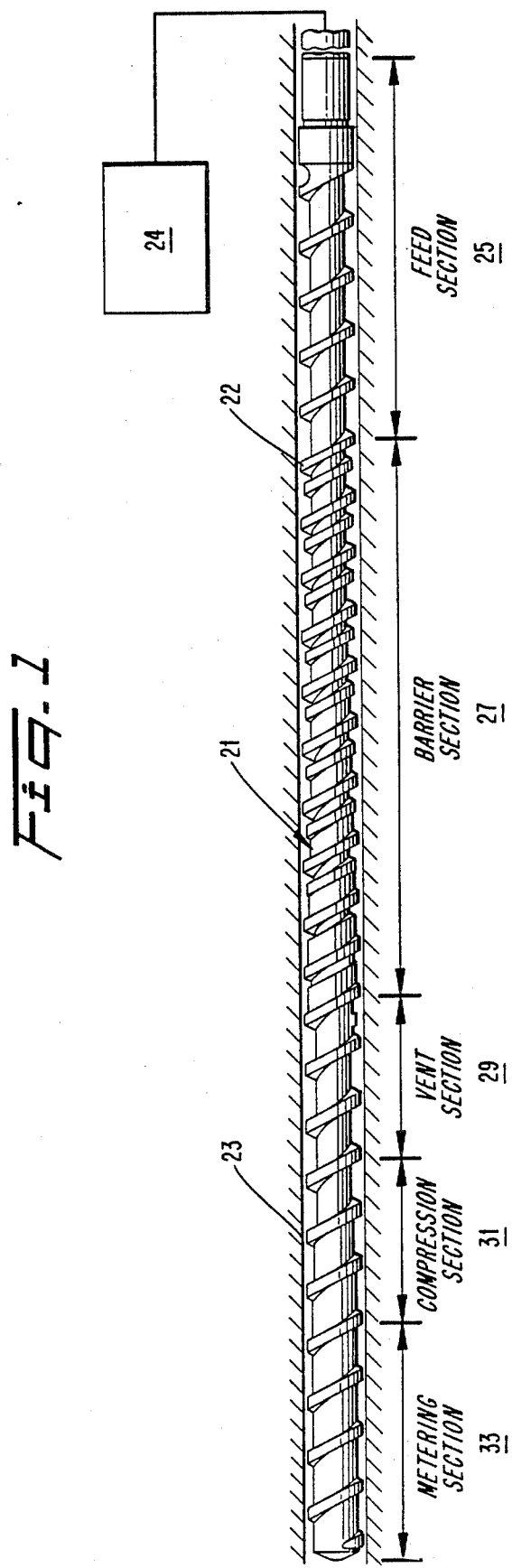

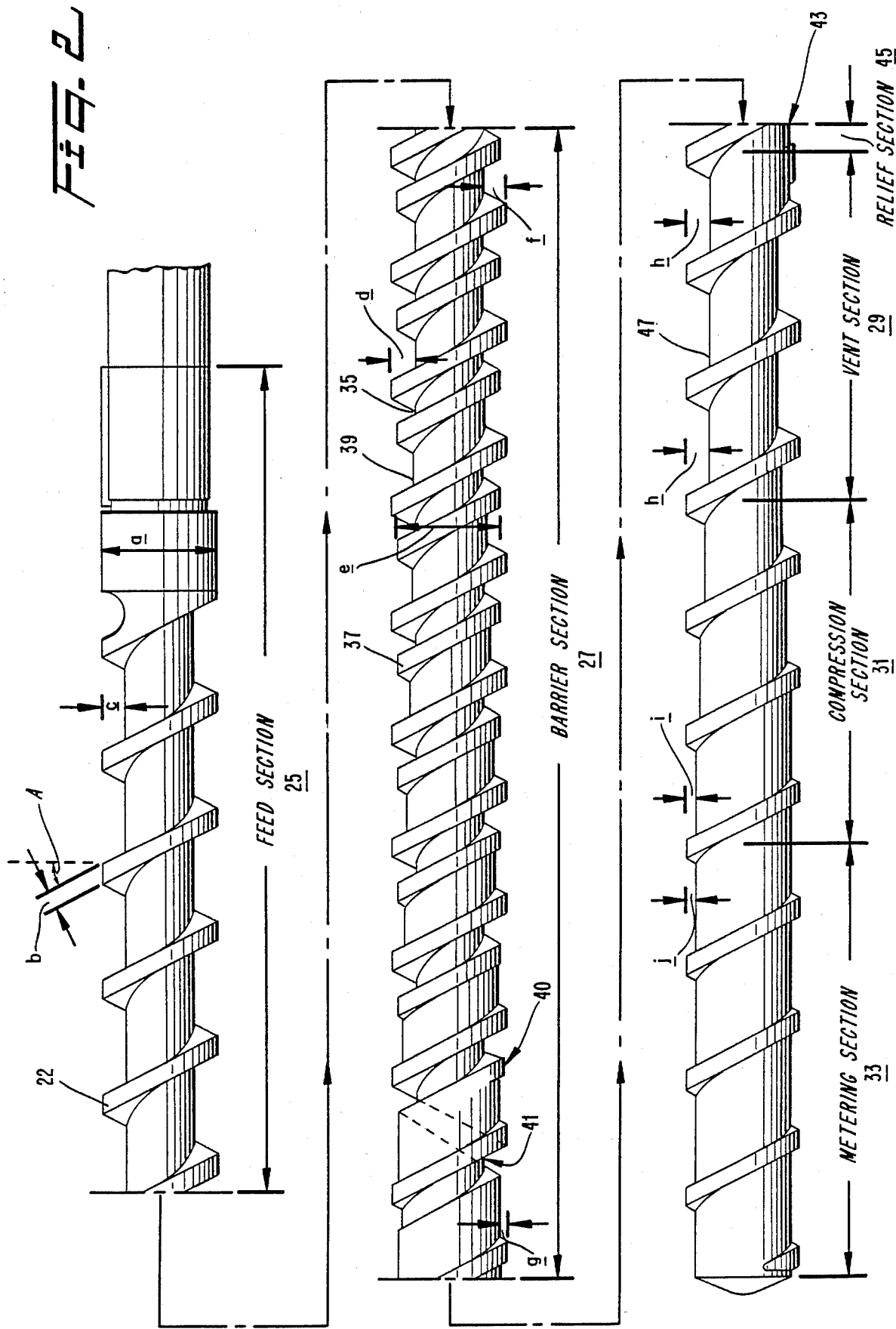

EXTRUDER SCREW AND METHOD FOR EXTRUDING LIQUID CRYSTALLINE POLYMERS

This application is a divisional, of application Ser. No. 847,387, filed Apr. 2, 1986 U.S. Pat. No. 4,729,662.

BACKGROUND AND SUMMARY OF THE PRESENT INVENTION

The present invention relates to an extruder screw and a method for extruding polymers. More particularly, the present invention relates to an extruder screw and a method for extruding low melt viscosity liquid crystalline polymer.

Melt processable polymers which are capable of forming an anisotropic (crystalline) melt phase have been developed for use in making shaped plastic articles. These polymers have been found to be highly desirable to form shaped articles having improved mechanical properties. For instance, such shaped articles exhibit markedly smoother surface characteristics, are self-supporting and can be used at elevated temperatures for extended periods of time while being able to retain the desired mechanical characteristics at the elevated temperatures. Accordingly, these polymers are particularly useful for forming shaped articles including tubes, rods and molded articles.

Such polymers are described in greater detail, for example, in U.S. Pat. Nos. 3,991,013; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,272,625; 4,279,803; 4,294,955; 4,299,756; 4,330,457; 4,318,841; 4,335,232; 4,337,190; 4,337,191; 4,339,375; 4,341,688; 4,347,349; 4,351,917; 4,351,918; 4,335,132; 4,355,134; 4,359,569; 4,360,658; 4,370,466; 4,374,228; 4,374,261; 4,375,530; 4,377,681; and 4,429,100, among others.

It is highly desirable to provide an extruder screw and method for permitting these polymers to be extruded rather than limiting their applications to injection molding and other processes. While various different extruder screw designs and configurations have been proposed in the past for different types of materials, there are no known extruder screws or methods particularly adapted for use with these liquid crystalline polymers.

For example, one extruder screw is disclosed in U.S. Pat. No. 4,000,884 issued to Chung. The Chung patent discloses an extruder screw including a feeding section connected to a melting section having a double helix design with a constantly decreasing solids channel profile and a constantly increasing melt channel profile. A transition section decreases the final melt channel depth continuously to a relatively small depth which is maintained constant in a metering section.

Another extruder screw is disclosed in U.S. Pat. No. 4,129,386 issued to Rauwendaal. The Rauwendaal patent discloses an extruder screw design including variations in both the helix angle and the depth of the channels. In particular, the Rauwendaal patent discloses a relatively constant depth channel in a feed section, a constantly decreasing channel depth (or flight height) in a transition section leading to a constant channel depth metering section. The Rauwendaal patent also discloses a double helix design in the transition section (FIG. 6). In addition, the Rauwendaal patent suggests an extruder screw speed of up to 120 rpm (Example 1, col. 5).

U.S. Pat. No. 4,321,229 issued to Blakeslee, III et al again discloses an extruder screw having a constant depth channel in the feeding section, and a constantly decreasing depth channel in the transition section. The final channel depth in the transition section is maintained in a metering section. The depth of the channel in the metering section is specified as being at least 0.25 inches.

Other patents disclosing extruder screws include U.S. Pat. No. 4,357,291 (Miller et al) which discloses an extruder screw having a feed section, a metering section and a second metering section. Different, substantially constant depth channels are provided within the respective sections. U.S. Pat. No. 4,173,445 (McKelvey et al) discloses a channel depth which constantly decreases from a feeding section to a metering or melt pumping section. Other extruder screw patents include U.S. Pat. Nos. 4,350,657 (James et al); 4,310,484 (Blakeslee III); and 4,280,802 (Lang et al).

It has been found that most known extruder screw designs are not acceptable for processing the low melt viscosity liquid crystalline polymers, particularly the liquid crystalline polyesters, due to the uniqueness of the material. That uniqueness is primarily directed to the rheology of the low melt viscosity liquid crystalline polymers.

It is the abnormally low viscosity of these polymers in the melted condition which causes problems in processing the material through known extruder screws. For example, the rheology of these particular polymers leads to a tendency toward backflow within the extruder screw which tendency is much greater than that encountered with other materials. Moreover, the flow of the liquid crystalline polymer is substantially different over the flights of the extruder screw than in the channels. The extremely low viscosity of the liquid crystalline polymers causes flow over the flights of the screw which flow is detrimental to the operation of the screw. Moreover, the low viscosity makes it extremely difficult to provide a sufficient driving force to the material to promote an even flow of material along the helix of the screw. The melted polymer, e.g., a polyester, tends to move in a more random pattern rather than smoothly along the channels of the screw. Due to these unique rheological characteristics, known extruder screws have been found to be inappropriate with these low melt viscosity liquid crystalline polymers. The problems associated with extrusion of such low melt viscosity liquid crystalline polymers is particularly acute with polyesters.

Accordingly, it is an object of the present invention to provide an extruder screw and a method of extrusion which are particularly adapted for use with melt processable polymers which are capable of forming an anisotropic melt phase. The extruder screw and method of the present invention are more particularly adapted for use with such polymers having a low melt viscosity and more particularly adapted for liquid crystalline polyesters.

It is a further object of the present invention to provide an extruder screw and method which produces a sufficiently high pressure for the extruded low viscosity material such that the material may be passed through a filter prior to formation into the desired shape. Still a further object of the present invention is to provide an extruder screw and method which are carefully controlled such that the problems associated with extrusion of the low melt viscosity liquid crystalline polymers are avoided.

Once again it is pointed out that due to the extremely low viscosity and the unique rheology of these polymers, the extruder screw and the extrusion method must be particularly adapted for use with these materials. It is the unique cooperation of the various portions of the screw, each of which must be carefully designed and controlled, that produces an acceptable material at the end of the extrusion process. That material must be uniformly melted and uniformly distributed. Moreover, the low viscosity material must be uniformly and efficiently moved along the extruder screw channel without substantial backflow or flow over the screw flights in order to produce acceptable extrusion pressure and constant flow to produce high quality products.

These objects and others are achieved by an extruder screw and extrusion method according to the present invention. The method of extruding the low melt viscosity polymers which form an anisotropic melt phase includes the steps of feeding the polymer to a feed section of an extruder screw. The feed is melted in a barrier section of the screw and the melted feed material is vented in a vent section. The material is then compressed over a comparatively low ratio in a compression section. The extruder screw is rotated at a high rate of speed to effect a high pressure discharge of material leaving the compression section.

In accordance with a further aspect of the method of the present invention, a large volume flow is produced through the compression section. In a preferred embodiment, the large volume flow is obtained by providing a relatively great depth initial channel in the compression section and also providing a relatively low compression ratio within that section while rotating the screw at a high rate of speed. It is essential that a high pressure output be obtained by the method in order that the material may be properly passed through a filter prior to formation. It is the combination of ensuring uniform melting and movement of the polymer in the barrier section and providing a relatively low compression ratio with a relatively large volume flow and rotating the screw at a high rate of speed which produces the high pressure and effective extrusion of the unique polymers.

In accordance with the present invention, the extruder screw includes a feed section and a barrier section which is preferably composed of a double helix with a constant depth melt channel and a decreasing depth solids channels adjacent to the melt channel. The flight between the melt and solids channels of the barrier section permits flow of the material from the solids channel to the melt channel. Moreover, by carefully controlling the transition from the barrier section to the vent section, the uniformity and continued movement of the melt is further enhanced. Each dimension of the extruder screw according to the present invention is carefully controlled since there is an extremely small "window" of the channel depth that can be successfully utilized to be effective due to the unique rheology of the low melt viscosity liquid crystalline polymer. Moreover, a driving arrangement is provided for rotating the screw of a high rate of speed.

In a preferred embodiment, the extruder screw has a ratio of compression which is 2.0:1 to 2.5:1, and most preferably about 2.5:1. Moreover, the extruder screw is rotated at a speed of 100 to 140 revolutions, most preferably 120 revolutions per minute. To further enhance the flow of the material through the screw, the surfaces of the screw are all chrome-plated. Still further, the dimensional tolerances of the screw are extremely small. For example, the concentricity of the root diameter of the channels to the outside flight diameter is within 0.005 inches. Further, the extruder screw and method according to the present invention produce a pressure of greater than 1000 pounds per square inch for the material at the end of the metering section.

BRIEF DESCRIPTION OF THE DRAWINGS

A preferred embodiment of the present invention will be described in greater detail with refererence to the accompanying drawings, wherein like members bear like reference numerals and wherein:

FIG. 1 is a view of the extruder screw according to the present invention, arranged within an extrusion barrel; and FIG. 2 is an enlarged view of the screw of FIG. 1 broken into sections.

DETAILED DESCRIPTION OF THE PREFERRED EMBODIMENT

While the present invention will be described with reference to one particular example of an extrusion screw which has been found suitable for use with the low melt viscosity liquid crystalline polymers, it is to be understood that the present invention includes other extruder screw designs which conform to the basic extruder screw design parameters of the present invention as set forth herein. In particular, various precise numerical values of the preferred embodiment of the invention may be modified while still obtaining acceptable results. However, the one example being discussed in detail has been found to be particularly adapted for use with the unique polymers. In addition, the present invention will be described with particular reference to a low melt viscosity, liquid crystalline polyester. However, it is to be understood that the present invention is equally applicable to other low melt viscosity polymers which form an anisotropic melt phase.

It is the combination of various design parameters and features of the present invention which combination permits the extruder screw to successfully be utilized with the low melt viscosity liquid crystalline polymers. Some of the essential parameters of the present invention include the careful control of the channel depths and the compression ratio and the high rate of rotation of the extruder screw. Moreover, the location and design of the transition section between the barrier section and the compression section is critical to proper flow of the low viscosity material. Moreover, the deep channel depth in the initial portion of the compression section and the relatively small compression ratio provided in that compression section cooperate to ensure proper forward movement of the material with less backflow or flow over the extruder screw flight. Moreover, the high rate of revolution combined with the large volume of flow permitted within the deep channels of the compression section produce a high pressure discharge from the extruder screw which pressure is sufficient to pass the forwardly moving and uniformly melted material through a filter as is desired when utilizing the particular low melt viscosity liquid crystalline polyesters.

With reference to FIG. 1, an extruder screw 21 is arranged within an extrusion barrel 23 in a known manner. The extruder screw 21 has a helical flight 22 thereon for moving material along the length of the screw 21. The extruder screw 21 includes a feed section 25, a barrier section 27, a vent section 29, a compression section 31 and a metering section 33. A low melt viscosity liquid crystalline polymer, e.g., a polyester, is delivered to the feed section 25 through an inlet (not shown) and is passed progressively through the sections by rotation of the screw 21 by a suitable motor 24 in a known manner. Ultimately the material is delivered at the exit end from the metering section 33 through a filter, e.g., regular screen packs known to those skilled in the art (not shown), to the extrusion die for formation into the desired shape.

With reference to FIG. 2, in a preferred embodiment, the extruder screw 21 has a nominal diameter a of 0.99 inches. The feed section 25 of the screw 21 includes a helical flight 22 having a width b of 0.5 inches and an angle A to the vertical of approximately 18° (a square pitched screw). The flight diameter is also 0.99 inches. This flight diameter and the angle A remain constant throughout the entire length of the screw 21. Also, in the feed section a channel depth c is maintained constant at 0.2 inches.

The feed section 25 is connected to the barrier section 27 where the polyester feed material is melted. The barrier section 27 includes a double helix design including a melt channel 35 having a constant depth d of 0.2 inches. The double helix includes a barrier flight 37 having a width of 0.15 inches and an angle of 25° for partially separating the melt channel 35 from an adjacent solids channel 39. The diameter e of the barrier flight 37 is only 0.91 inches such that flow of material may occur over the barrier flight 37 from the solids channel 39 to the melt channel 35. The solids channel 39 constantly decreases in depth from an initial depth f of 0.20 inches to a final depth g of 0.017 inches. The melt channel depth remains constant at 0.2 inches throughout the barrier section 27.

It has been found that the double helix design is particularly effective to ensure proper melting and forward movement of the low viscosity liquid crystalline polyester feed material. It should be understood that it may be possible to effectively melt the polyester material without the double helix design if the barrier section 27 is substantially increased in length. It should also be understood that the dimensions and configuration of the barrier section 27 must be very carefully designed and controlled in order to properly urge the low viscosity polyester material to properly flow through the barrier section 27.

The barrier flight 37 runs out in a first region 40 such that the materials remaining in the melt channel 35 and the substantially decreased depth solids channel 39 are co-mingled. The melt channel 35 gradually tapers in a second region 41 beginning after the barrier flight 37 has run out to a downstream location 43 from 0.20 inches to 0.017. At this location 43, a combined channel 47 of the melt and solids channels runs out into a relief section 45. In the relief section 45, the combined channel depth gradually increases from 0.017 to 0.20 which latter depth h is maintained constant in the vent section 29. In the relief and vent sections, the melted material is subjected to subambient pressure to remove volatiles and to ensure proper venting of the material.

This "transition section", i.e., the first regions 40, the second region leading into the relief section 45, between the barrier section 27 and the vent section 29 is critical for ensuring proper operation of the extruder screw and method according to the present invention for extruding low melt viscosity liquid crystalline polyesters. The dimensions within this section must be carefully controlled and the surfaces machined to exacting tolerances in order to properly vent the polyester material and to ensure a smooth, continuous flow of the material through the channel of the extruder screw.

The compression in the transition section follows the profile occurring as the low bulk density pellets becomes molten and allows for adequate backmixing. Surging is avoided with this profile and the melting process is optimized.

After passing the vent section 29, the material is passed into the compression section 31. The dimensions of the compression section 31 must also be carefully controlled in order to ensure both proper compression and proper movement of the low viscosity melted polyester. The initial channel depth must be relatively large to aid in ensuring forward flow of the material while reducing backflow. In addition, the compression ratio within the compression section must be low compared to extruder screws for more viscous materials. This requirement for a reduced compression ratio is again due to the extremely low viscosity of the material. For example, a higher compression ratio ma cause surging of the material thereby disturbing the uniformity of the feeding of the material.

In the preferred embodiment, the compression section 31 has an initial channel depth of 0.20 inches. This channel depth is gradually decreased to a channel depth i at the end of the compression section of 0.08 inches. In other words, the compression within the compression section is 2.5:1. This compression ratio is relatively low compared to most extruder screws and extrusion methods. However, it has been found that with the unique rheology of the low melt viscosity liquid crystalline polyesters a greater compression ratio is ineffective for proper movement and extrusion of the material. It is understood that a compression ratio of at least 2.0:1 and up to 2.5:1 may be possible for use with the liquid crystalline polyesters. However, if the compression ratio is too great, problems of surging are more likely to occur.

Moreover, the initial depth of the channels in the compression section 31 is made as large as possible without effecting the strength of the material and may be comparatively large relative to standard extruder screw designs. In this way, a large volume of material may be passed through the compression section 31 in a given period of time. Further, due to the unique rheology of the polyesters, this greater channel depth is more effective in moving the material along the extruder screw 21.

After passing from the compression section 31, the compressed material is passed through a metering section 33 having a constant channel depth j of 0.08 inches. After passing the metering section 33, the material is preferably passed through a suitable filter (not shown) to a die (also not shown) for producing the desired shape.

In view of the preferred use of a filter at the end of the extruder screw, it is essential that the melted polyester material emanating from the extruder screw be at a sufficiently high pressure to be passed through the filter without causing undue back pressure within the metering section 33. Once again, due to the low viscosity of the melted polyester, such back pressure will likely cause flow of the material over the extruder screw flight 22. A pressure of at least 1,000 pounds per square inch, and preferably greater than 1,100 pounds per square inch, has been found sufficient to overcome problems. In order to obtain this pressure with the relatively low compression ratio employed in the compression section 31, it is essential that the screw be rotated at a speed which is substantially higher than the speed of rotation of extruder screws for other plastics material.

In the preferred embodiment, the screw 21 is rotated by the motor 24 at a rate of 120 revolutions per minute. With the particular design of the preferred embodiment of the screw 21, lower rates of speed have been found to be less effective in producing the desired flow and pressure of the extruded material. However, with modifications in the exact dimensions of the screw design, particularly in the compression section 31, extruder screw speeds of 110 to 130 revolutions per minute are likely to be acceptable. Although higher speeds may also be possible, conventional extruders are generally not designed for such higher speed operation. Lower operating speeds reduce the output but are believed to be economically feasible. It is the combination of the high rate of rotation and the large volume flow permitted through the relatively deep channels of the compression section 31 of the present invention that ensures the high pressure discharge of the compression section sufficient to pass the material through the filter to the die and/or mold.

The relative depths of the channels in the compression section 31, as noted previously, are important to the operation of the extruder screw and method according to the present invention. In the preferred embodiment, the beginning channel depth of the compression section 31 is in the range of 40% of the outer radius of the screw 21. Still further in the preferred embodiment, the ratio of the final channel depth of the compression section 31 to the outer screw radius is in the range of 16%. The initial depth is preferably made as deep as possible without adversely effecting the strength of the extruder screw 21. In this way, the desired compression ratio of 2.0:1 to 2.5:1 can be more easily obtained while retaining the large initial channel depth which permits the high pressure and volume flow necessary for use with the liquid crystalline polyesters due, in part, to their unique rheology.

Moreover, the dimensions of the screw 21 must be carefully controlled and the surfaces of the screw must be smooth in order to effectively move the low viscosity liquid crystalline polyester material along the screw channel. In the preferred embodiment, all the surfaces of the screw 21 are chrome-plated in order to enhance the flow of the low viscosity polyester. Still further, the concentricity of the root diameter of the channels to the outside flight diameter is within 0.005 inches.

Once again it is noted that if any one of the relationships between the dimensions of the screw according to the preferred embodiment is varied, the operation of the screw for use with the low viscosity liquid crystalline polyester suffers. Each and every dimension must be carefully controlled and designed for use with the particular class of polymer. It is the highly unusual properties of these polymers which require such careful control and careful selection of the relative dimensions and configurations of the various sections of the screw.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended tha all such variations and changes which fall within the spirit and scope of the present invention as defined in the claims be embraced thereby.

What is claimed is:

1. An extruder screw for a low melt viscosity polymer which forms an anisotropic melt phase, comprising:
   a feed section;
   a barrier section having a barrier flight defining a channel, said barrier section extending along a substantial portion of the length of said screw and including means for subjecting at least portions of the polymer to a gradually decreasing channel depth to thereby aid in melting the polymer during passage along the screw;
   a vent section for venting the melted polymer;
   a compression section including a channel having a gradually decreasing depth for gradually compressing the polymer over a comparatively low ratio, the channel being formed to precise tolerance, an initial channel depth being relatively deep and the ratio of compression within the compression section being relatively small; and
   means for rotating said extruder screw at a high rate of speed to generate high pressures in the polymer within the compression section of the screw.

2. The extruder screw of claim 1, wherein the ratio of compression is 2.0:1 to 2.5:1.

3. The extruder screw of claim 1, wherein the rate of rotation of the screw is 100 to 140 revolutions per minute.

4. The extruder screw of claim 1, further comprising a relief section between the barrier section and the compression section, said relief section being connected to a source of sub-atmospheric pressure for removal of volatiles.

5. The extruder screw of claim 1, wherein the surfaces of the screw are chrome plated.

6. The extruder screw of claim 1, wherein the extruder screw includes a root diameter and an outside flight diameter substantially concentric with said root diameter, and wherein the concentricity of said root diameter and said outside flight diameter is within 0.005 inches.

7. The extruder screw of claim 1, wherein the polymer is a polyester.

8. An extruder screw for a low melt viscosity polymer which forms an anisotropic melt phase, comprising:
   a feed section;
   a barrier section for uniformly melting the polymer along a substantial portion of the length of the screw;
   a compression section for compressing the melted polymer over a comparatively small compression ratio;
   a metering section;
   a filter downstream of the metering section;
   said compression section being arranged to produce pressure sufficiently high to force said material through the filter, said compression section having channels sufficiently deep to permit a high volume flow rate; and means for rotating said screw at a high velocity to ensure the high volume flow rate through said channels of said compression section.

9. The extruder screw of claim 8, wherein the speed of rotation of the screw is greater than 115 revolutions per minute.

10. The extruder screw of claim 8, wherein the pressure is greater than 1,000 pounds per square inch.

11. The extruder screw of claim 8, wherein the extruder screw has an outer radius, and wherein the beginning channel depth of the compression section is in the range of 40% of the outer radius of the screw.

12. The extruder screw of claim 8, wherein the polymer is a polyester.

13. An extruder screw for a low melt viscosity polymer which forms an anisotropic melt phase, comprising:
a feed section having constant depth channels;
a barrier section for uniformly melting the polymer along a substantial portion of the length of the screw in said barrier section including a melt channel and a solids channel in a double helix arrangement, the solids channel gradually decreasing in depth and the melt channel having a constant depth;
a compression section having a channel with a gradually decreasing channel depth for compressing the melted polymer over a comparatively small compression ratio;
a transition section for connecting the barrier section with the compression section;
a metering section having a channel with a constant channel depth equal to the smallest depth of the channel in the compression section; and
an external diameter of the screw being constant throughout the length of the screw.

14. The extruder screw of claim 13, wherein the transition section includes a first region in which a barrier flight between the melt and solids channels runs out, a second region downstream of said first region in which the depth of the melt channel gradually decreases to the smallest depth of the solids channel and in which a combined channel of the melt and solids channels gradually increases in depth from the smallest depth of the solids channel to a depth substantially equal to the melt channel depth.

15. The extruder screw of claim 13, wherein the polymer is a polyester.

* * * * *